United States Patent [19]

Jang

[11] Patent Number: 5,734,449
[45] Date of Patent: Mar. 31, 1998

[54] LIQUID CRYSTAL DISPLAY APPARATUS HAVING AN OPAQUE CONDUCTIVE CAPACITOR ELECTRODE AND MANUFACTURING METHOD THEREOF

[75] Inventor: Seok Pil Jang, Kyungki-do, Rep. of Korea

[73] Assignee: LG Electronics Inc., Seoul, Rep. of Korea

[21] Appl. No.: 490,059

[22] Filed: Jun. 13, 1995

[30] Foreign Application Priority Data

Jun. 17, 1994 [KR] Rep. of Korea ............... 13785/1994

[51] Int. Cl.⁶ ............................ G02F 1/1343; G02F 1/1333
[52] U.S. Cl. .......................... 349/39; 349/111; 349/162
[58] Field of Search ......................... 349/162, 38, 39, 349/111

[56] References Cited

U.S. PATENT DOCUMENTS

| | | | |
|---|---|---|---|
| 4,759,610 | 7/1988 | Yanagisawa | 349/162 |
| 5,012,274 | 4/1991 | Dolgoff | 340/702 |
| 5,028,122 | 7/1991 | Hamada et al. | 349/38 |
| 5,182,661 | 1/1993 | Ikeda et al. | 349/42 |
| 5,321,535 | 6/1994 | Ukai et al. | 349/85 |
| 5,600,461 | 2/1997 | Ueda et al. | 349/38 |
| 5,657,101 | 8/1997 | Cheng | 349/38 |

*Primary Examiner*—William L. Sikes
*Assistant Examiner*—Charles Miller
*Attorney, Agent, or Firm*—John P. White

[57] ABSTRACT

A liquid crystal display apparatus and a manufacturing method thereof is disclosed, including a storage capacitor part being comprised of a lower storage electrode formed on the same base material as the above, first and second insulation films for isolating the lower storage electrode from a upper storage electrode, an upper storage electrode formed by patterning conductive material deposited on the second insulation film, a third insulation film for isolating the upper storage electrode from the upper structure, and a pixel electrode at the upper side of the third insulation film, thereby providing the required capacitance with the reduced area of the storage capacitance part so as to enhance the brightness of the liquid crystal display apparatus and improve image quality by increasing pixel numbers without the reduction of the brightness.

5 Claims, 3 Drawing Sheets

LIQUID CRYSTAL DISPLAY APPARATUS HAVING AN OPAQUE CONDUCTIVE CAPACITOR ELECTRODE AND MANUFACTURING METHOD THEREOF

BACKGROUND OF THE INVENTION

The present invention relates to a liquid crystal display apparatus and a manufacturing method thereof, and more particularly to a liquid crystal display apparatus and a manufacturing method thereof for enhancing the aperture efficiency by reducing the area of a storage capacitor, which is possible by increasing capacitance by using a black matrix in forming the storage capacitor.

Generally, a thin film transistor array is positioned in a thin film transistor part 50 of a lower plate pixel of a liquid crystal display apparatus. As shown in the left of FIG. 1, the thin film transistor part includes buffer layer 2 deposited on insulation substrate such as glass or crystal, active layer 3 patterned after semiconductive material being deposited upon buffer layer 2, first insulation film 4 being made by depositing insulation material upon active layer 3 in order to be used as a gate insulation film, gate electrode 5 patterned after poly-crystalline silicon, metal or silicide having a doping agent being deposited upon first insulating film 4, second insulating film 6 where insulating material is deposited on the whole surface of the resultant product where gate electrode 5 is formed to insulate gate electrode 5, after activated by injecting n-type or p-type dopant with a mask of gate electrode 5, and data line 8 where a contact hole is formed by etching a part of second insulating film 6 and first insulating film 4 in the upper side of active layer 3 such that active layer 3 is exposed and then conductive material is deposited so as to contact with active layer 3 through the contact hole.

As shown in the right of FIG. 1, storage capacitor part 100 includes buffer layer 2 deposited on insulation film 1, first insulation film 4 being formed by depositing insulation material on buffer layer 2, storage electrode 5' being patterned after poly-crystalline silicon, metal or silicide having a doping agent is deposited with gate electrode 5 of lower plate pixel unit 100 of first insulation film 4, second insulation film 6 formed by depositing again insulation material on storage electrode 5', and pixel electrode 7 being patterned by depositing transparent conductive material on second insulation film 6.

However, the above liquid crystal display apparatus as shown in FIG. 2, when the thin film transistor connected to the data line and the gate line is off, storage capacitance $C_{s1}$ should be increased beyond a particular value to compensate the pixel voltage shifting effect in order to obtain an image of high quality by maintaining the voltage shifting of the pixel electrode below a particular value. In a conventional apparatus, the method of increasing the area of the storage capacitor part is employed, but in such a case, aperture efficiency is reduced so that the image quality is deteriorated.

SUMMARY OF THE INVENTION

To solve the above problems, it is an object of the present invention to provide a liquid crystal display apparatus which can enhance image brightness and increase pixel numbers maintaining the image brightness beyond a particular value, by increasing a capacitance of the same storage capacitor area.

It is another object of the present invention to provide a method for the effective manufacture of the liquid crystal display apparatus.

Accordingly, to achieve the above first object, there is provide a liquid crystal display apparatus comprising: a thin film transistor part being comprised of a black matrix and a first insulation film being layered in order on a base material, an active layer formed by patterning a semiconductor which is deposited on said first insulation film, a second insulation film for isolating said active layer from a gate electrode, a gate electrode formed by patterning conductive material which is deposited on said second insulation film, a third insulation film for isolating said gate electrode from upper structure, and a source/drain electrode being connected with said active layer through a etched part of said second and third insulation films; and a storage capacitor part being comprised of a lower storage electrode formed on the same base material as the above, first and second insulation films for isolating said lower storage electrode from a upper storage electrode, an upper storage electrode formed by patterning conductive material deposited on said second insulation film, a third insulation film for isolating said upper storage electrode from the upper structure, and a pixel electrode at the upper side of said third insulation film.

To achieve the second object, there is provided a manufacturing method for a liquid crystal display comprising the steps of: forming a black matrix of a thin film transistor part and a lower storage electrode of a storage capacitor part at the same time by depositing, on a base material, material which cuts off light and has conductivity; forming a first insulation film on said black matrix and said lower storage electrode; forming an active layer on the thin film transistor part by depositing semiconductive material on said first insulation film and patterning the deposited surface; forming a second insulation film on the whole surface of the resultant product after said active layer is formed; forming a gate electrode of the thin film transistor part and an upper storage electrode by depositing conductive material on said second insulation film and patterning the deposited surface, and then, forming a source/drain area by injecting a N-type or a P-type dopant for activation using the gate electrode as a mask; forming a third insulation film on the whole of the resultant product after the gate electrode and the upper storage electrode are formed; forming a pixel electrode on the third insulation film of the storage capacitor part; and forming a contact hole by selectively etching the second and third insulation films to expose the active layer and the lower storage electrode, and connecting the lower storage electrode with the pixel electrode by depositing conductive material on the whole surface of the resultant product and patterning the deposited surface and, at the same time, forming a source/drain electrode which connects the active layer through the contact hole.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
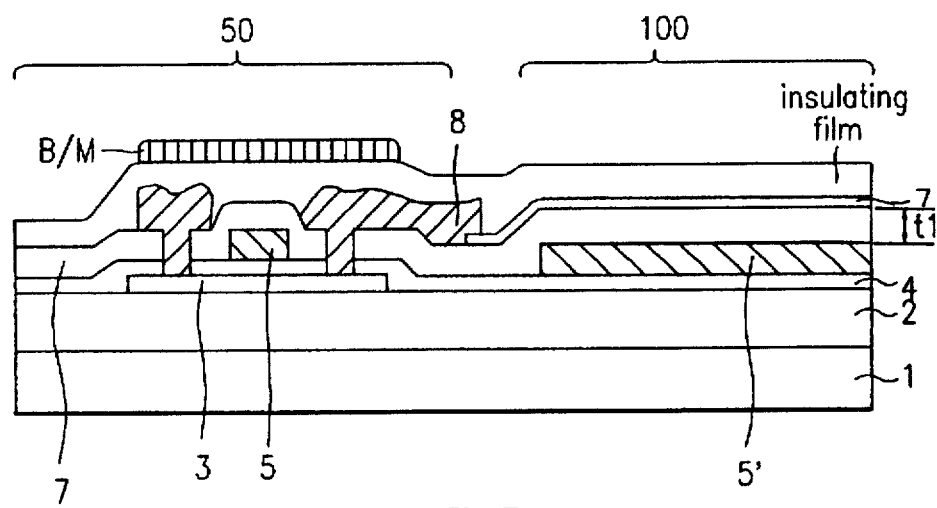
FIG. 1 is a cross-sectional view showing a conventional liquid crystal display apparatus.
Figure 2:
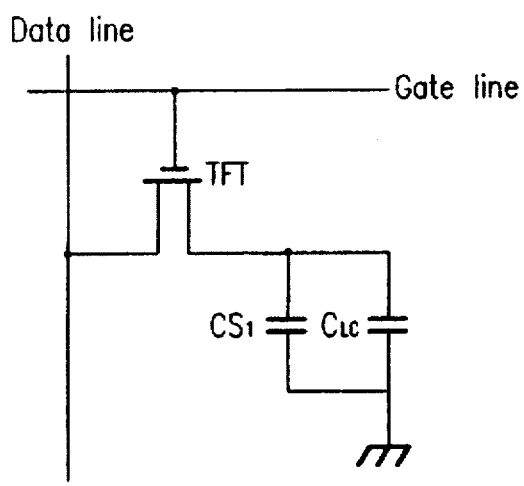
FIG. 2 is an equivalent circuit illustrating a conventional pixel unit.
Figure 3:
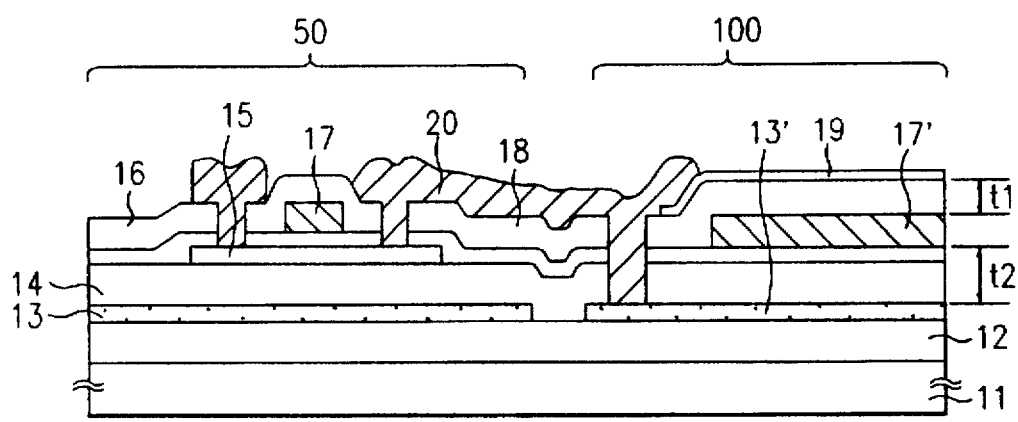
FIG. 3 is a cross-sectional view showing a liquid crystal display apparatus according to the present invention.
Figure 4:
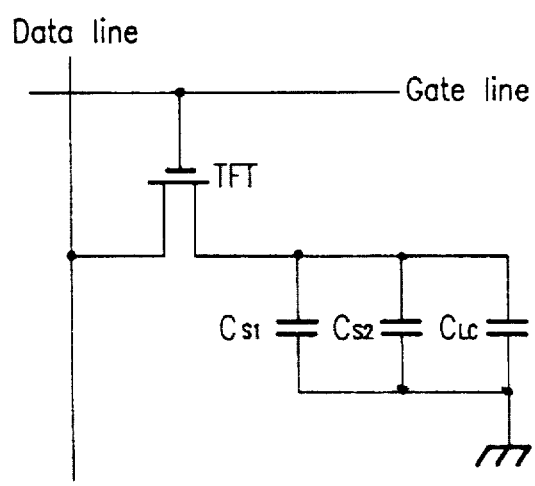
FIG. 4 is an equivalent circuit illustrating a pixel unit according to the present invention.

In the liquid crystal display apparatus of the present invention as shown in FIG. 3, lower storage electrode 13' and upper storage electrode 17' of storage capacitor part 100 which is concurrently formed with black matrix 13 of thin film transistor part 50 as material for cutting off light and being conductive, are connected in parallel as shown in FIG. 4, so that the total capacitance increases with the same manufacture area as a conventional one.

At this time, if the thickness $t_1$ of the insulation film between upper storage electrode 17' and pixel electrode 19 and the thickness $t_2$ of the insulation film between lower storage electrode 13' and upper storage electrode 17', are identical, capacitance Cs(A) of a conventional constitution and the total capacitance Cs(B) are $Cs(A)=Cs_1$ ($Cs_1=A(\epsilon_0\epsilon_1)/t_1$: A is an area of storage capacitor part, $\epsilon_0$ is a dielectric factor, and $\epsilon_1$ is a dielectric constant) and $Cs(B)=Cs_1+Cs_2$ ($Cs_2=A(\epsilon_0\epsilon_1)/t_2$), so as to be the double of conventional capacitance Cs(a).

The manufacturing method of the liquid crystal display apparatus equipped with the upper and lower storage electrodes is shown in FIGS. 5A to 5E.

Figure 5A:
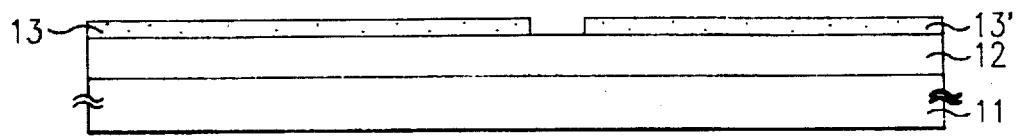
FIGS. 5A to 5E showing a production sequence by a manufacturing method of the liquid crystal display apparatus according to the present invention.

First, in FIG. 5A, buffer layer 12 is formed on transparent substrate 11 such as glass or crystal. Then, material for cutting off light such as metal or silicide is deposited with a predetermined thickness on buffer layer 12, and patterned. Thus, black matrix 13 is formed in the thin film transistor part and at the same time, lower storage electrode 13' is formed in storage capacitor part.

Figure 5B:
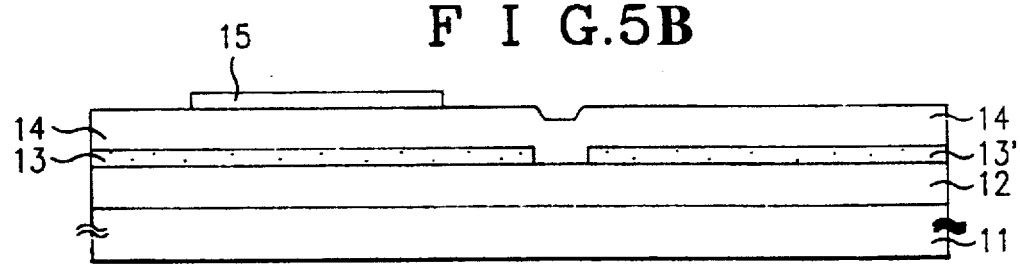

In FIG. 5B, first insulation film 14 is formed by depositing substrate insulation material with a predetermined thickness on the whole surface of a structure where lower storage electrode 13' is formed. Active layer 15 is formed by depositing semiconductive material with a predetermined thickness on first insulation film 14 and then etching the deposited surface so that the semiconductive material is left only on the thin film transistor part. Here, first insulation film 14 must be excessively etched to increase capacitance by reducing the thickness of first insulation film.

Figure 5C:
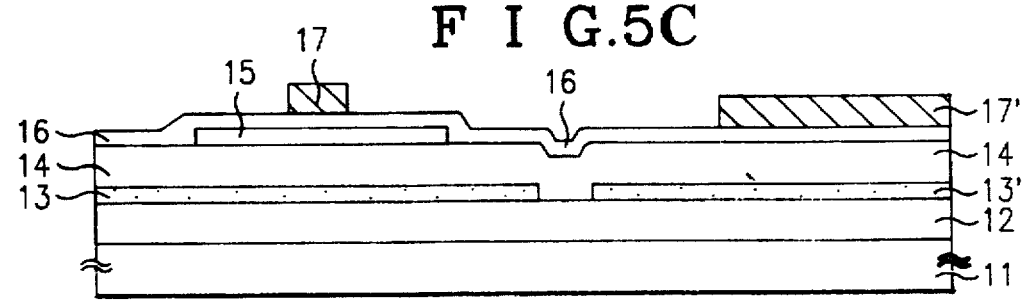

In FIG. 5C, second insulation film 16 is formed by depositing insulation material on the whole surface of the resultant product forming active layer 15. To form gate electrode 17 and upper storage electrode 17' by depositing poly-crystalline silicon, metal, silicide having a doping agent or amorphous silicon having a doping agent with a predetermined thickness on second insulation film 16 and patterning the deposited surface. Then, by using gate electrode 17 as a mask, N-type or P-type dopant is injected so as to form a source. During the above patterning process, second insulation film 16 is excessively etched in order to diminish the thickness of the insulation film as in FIG. 5B.

Figure 5D:
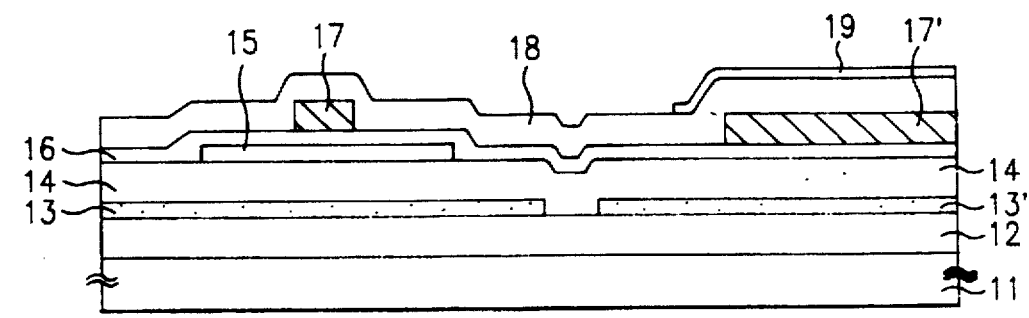

In FIG. 5D, after gate electrode 17 and upper storage electrode 17' are formed, third insulation film 18 for isolating gate electrode 17 and upper storage electrode 17' from the upper structure, is formed by depositing insulation material on the resultant product. Then, pixel electrode 19 is formed by depositing transparent conductive material on third insulation film 18 of the storage capacitor part and patterning the deposited surface.

Figure 5E:
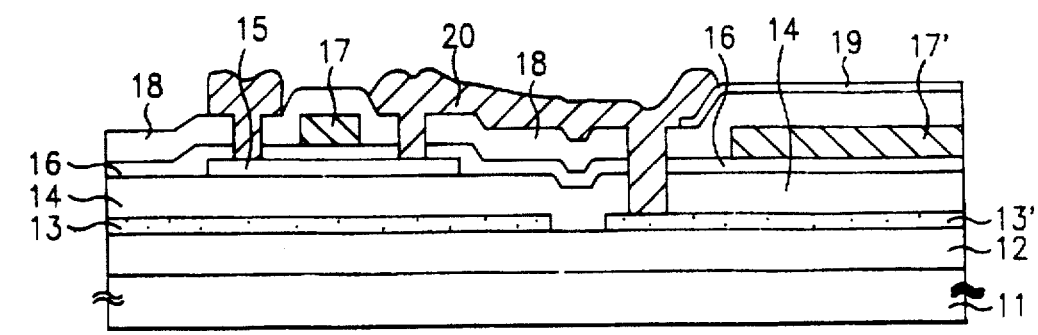

In FIG. 5E, after pixel electrode is formed, a contact hole is formed by selectively etching second and third insulation films 16 and 18 and exposing active layer 15 and lower storage electrode 13'. Then, lower storage electrode 13' and pixel electrode are connected by depositing conductive material, such as aluminium, on the whole surface of the resultant product and patterning the deposited surface. At the same time, source/drain electrode 20 is formed, which contacts active layer 15 through the contact hole.

As described above, the present invention can provide the required capacitance with the reduced area of the storage capacitance part, thereby enhancing the brightness of the liquid crystal display apparatus and improving image quality by increasing pixel numbers without the reduction of the brightness.

What is claimed is:

1. A liquid crystal display apparatus comprising:

a thin film transistor part, being comprised of a black matrix and a first insulation film being layered in order on a base material, an active layer formed by patterning a semiconductor which is deposited on said first insulation film, a second insulation film for isolating said active layer from a gate electrode, a gate electrode formed by patterning conductive material which is deposited on said second insulation film, a third insulation film for isolating said gate electrode from upper structure, and a source/drain electrode being connected with said active layer through a etched part of said second and third insulation films;

a storage capacitor part, being comprised of a lower storage electrode formed on the same base material as the above, first and second insulation films for isolating said lower storage electrode from a upper storage electrode, an upper storage electrode formed by patterning conductive material deposited on said second insulation film, a third insulation film for isolating said upper storage electrode from the pixel electrode, wherein said pixel electrode is at the upper side of said third insulating film.

2. A liquid crystal display apparatus described in claim 1, wherein a transparent substrate is used for said base material.

3. A manufacturing method for a liquid crystal display comprising the steps of:

forming a black matrix of a thin film transistor part and a lower storage electrode of a storage capacitor part at the same time by depositing, on a base material, material which cuts off light and has conductivity;

forming a first insulation film on said black matrix and said lower storage electrode;

forming an active layer on the thin film transistor part by depositing semiconductive material on said first insulation film and patterning the deposited surface;

forming a second insulation film on the whole surface of the resultant product after said active layer is formed;

forming a gate electrode of the thin film transistor part and an upper storage electrode by depositing conductive material on said second insulation film and patterning the deposited surface, and then, forming a source/drain area by injecting a N-type or a P-type dopant for activation using the gate electrode as a mask;

forming a third insulation film on the whole of the resultant product after the gate electrode and the upper storage electrode are formed;

forming a pixel electrode on the third insulation film of the storage capacitor part; and forming a contact hole by selectively etching the second and third insulation films to expose the active layer and the lower storage electrode, and connecting the lower storage electrode with the pixel electrode by depositing conductive material on the whole surface of the resultant product and patterning the deposited surface and, at the same time, forming a source/drain electrode which connects the active layer through the contact hole.

4. A manufacturing method for a liquid crystal display described in claim 3, wherein a step of etching the upper area of the first insulation film is included in said step of forming the active layer.

5. A manufacturing method for a liquid crystal display described in claim 3, wherein a step of etching the upper area of the second insulation film is included in said step of forming the gate electrode and the upper storage electrode.

* * * * *